United States Patent
Mori et al.

(10) Patent No.: US 9,651,272 B2
(45) Date of Patent: May 16, 2017

(54) AIR-CONDITIONING CONTROL SYSTEM AND AIR-CONDITIONING CONTROL METHOD

(75) Inventors: Yasuhisa Mori, Tokyo (JP); Hideo Tomita, Tokyo (JP); Norikazu Sasaki, Tokyo (JP)

(73) Assignee: Hitachi Appliances, Inc., Tokyo (JP)

( * ) Notice: Subject to any disclaimer, the term of this patent is extended or adjusted under 35 U.S.C. 154(b) by 450 days.

(21) Appl. No.: 14/380,302

(22) PCT Filed: Aug. 29, 2012

(86) PCT No.: PCT/JP2012/071859
§ 371 (c)(1),
(2), (4) Date: Aug. 21, 2014

(87) PCT Pub. No.: WO2013/145364
PCT Pub. Date: Oct. 3, 2013

(65) Prior Publication Data
US 2015/0039135 A1 Feb. 5, 2015

(30) Foreign Application Priority Data
Mar. 30, 2012 (JP) ................................. 2012-080623

(51) Int. Cl.
*G05B 15/00* (2006.01)
*F24F 11/00* (2006.01)
(Continued)

(52) U.S. Cl.
CPC ...... *F24F 11/0009* (2013.01); *F24F 11/0012* (2013.01); *F24F 11/0015* (2013.01);
(Continued)

(58) Field of Classification Search
None
See application file for complete search history.

(56) References Cited

U.S. PATENT DOCUMENTS

| 7,287,393 B2 * | 10/2007 | Kwon | F24F 11/0086 |
| | | | 236/51 |
| 7,340,912 B1 * | 3/2008 | Yoho, Sr. | F24F 3/1423 |
| | | | 62/305 |

(Continued)

FOREIGN PATENT DOCUMENTS

| JP | 06-335164 | 12/1994 |
| JP | 11-287496 | 10/1999 |

(Continued)

OTHER PUBLICATIONS

Zheng et al. "A practical deployment of Intelligent Building Wireless Sensor Network for environmental monitoring and air-conditioning control", 2010 IEEE, pp. 624-628.*

(Continued)

*Primary Examiner* — Van Nguyen
(74) *Attorney, Agent, or Firm* — Foley & Lardner LLP

(57) ABSTRACT

A base terminal receives the air-conditioning control information from the server, and on the basis of the received air-conditioning control information, when a power consumption value in a site is greater than the target power value for demand control, the base terminal transmits, to air-conditioning control equipment, a control instruction that sets an air conditioner to OFF, and when the temperature measured in an area is greater than the upper limit temperature when the air conditioner is performing a cooling operation, or when the temperature measured in the area is less than the lower limit temperature when the air conditioner is performing a heating operation, the base terminal transmits a control instruction that sets the air conditioner to ON.

6 Claims, 17 Drawing Sheets

(51) Int. Cl.
    *H02J 3/14*     (2006.01)
    *G05B 15/02*    (2006.01)
    *H04L 29/06*    (2006.01)

(52) U.S. Cl.
    CPC ............... *G05B 15/02* (2013.01); *H02J 3/14* (2013.01); *H04L 67/42* (2013.01); *F24F 2011/0075* (2013.01); *F24F 2011/0091* (2013.01); *H02J 2003/143* (2013.01); *Y02B 70/3225* (2013.01); *Y02B 70/3266* (2013.01); *Y02B 70/3275* (2013.01); *Y04S 20/222* (2013.01); *Y04S 20/224* (2013.01); *Y04S 20/242* (2013.01); *Y04S 20/244* (2013.01)

(56) References Cited

U.S. PATENT DOCUMENTS

| | | | | |
|---|---|---|---|---|
| 7,542,824 | B2 * | 6/2009 | Miki | F24F 11/006 236/94 |
| 8,051,156 | B1 * | 11/2011 | Sharma | G06F 9/5094 700/276 |
| 8,199,504 | B2 * | 6/2012 | Kashirajima | F25B 25/00 165/104.33 |
| 2005/0228618 | A1 * | 10/2005 | Patel | G06F 9/505 702/188 |
| 2006/0047808 | A1 * | 3/2006 | Sharma | G06F 9/505 709/224 |
| 2008/0140259 | A1 * | 6/2008 | Bash | G05D 23/192 700/278 |
| 2009/0327778 | A1 * | 12/2009 | Shiga | G05D 23/1919 713/320 |
| 2013/0317654 | A1 * | 11/2013 | Kashirajima | F24F 11/0009 700/276 |

FOREIGN PATENT DOCUMENTS

| | | |
|---|---|---|
| JP | 2000-333368 A | 11/2000 |
| JP | 2007-202277 A | 8/2007 |
| JP | 2012-039856 A | 2/2012 |

OTHER PUBLICATIONS

Funami et al. "Evaluation of power consumption and comfort using inverter control of air-conditioning", 2011 IEEE, pp. 3236-3241.*
Cremonesi et al. "Optimizing Cooling and Server Power Consumption", 2011 IEEE, pp. 455-462.*
PCT International Search Report on application PCT/JP2012/071859 mailed Nov. 13, 2012; 2 pages.
Introduction of Demand Control System; Tokyo Electric Power Co., Inc.; , searched on Mar. 15, 2012; [online] <URL: http://www.tepco.co.jp/setsuden/business/demand-j.html>; pp. 1-3.
"Electricity charge→ Information on contract electricity→ [Institutional clients]→ Information on contract → contract demand"; searched on Mar. 15, 2012; , [online]: <URL: http://www.tohoku-epco.co.jp/dbusiness/service/rule.html>; first page.
"Air-conditioning Integrated Monitoring System, STAIMS System"; Sanyo Electric Co., Ltd.; Oct. 2010; searched on Mar. 15, 2012; , [online] <URL: http://catalog.jp.sanyo.com/staims/pageview/data/target.pdf>: 8 pages.
"Air-conditioning Energy Saving System [ESSOR]"; Sanyo Electronic Industry Co., Ltd. searched on Mar. 15, 2012; , [online]: <URL: http://www.sdk-kk.co.jp/prd/essor/ESSOR_exp.html>; pp. 1-2.

* cited by examiner

F I G . 1
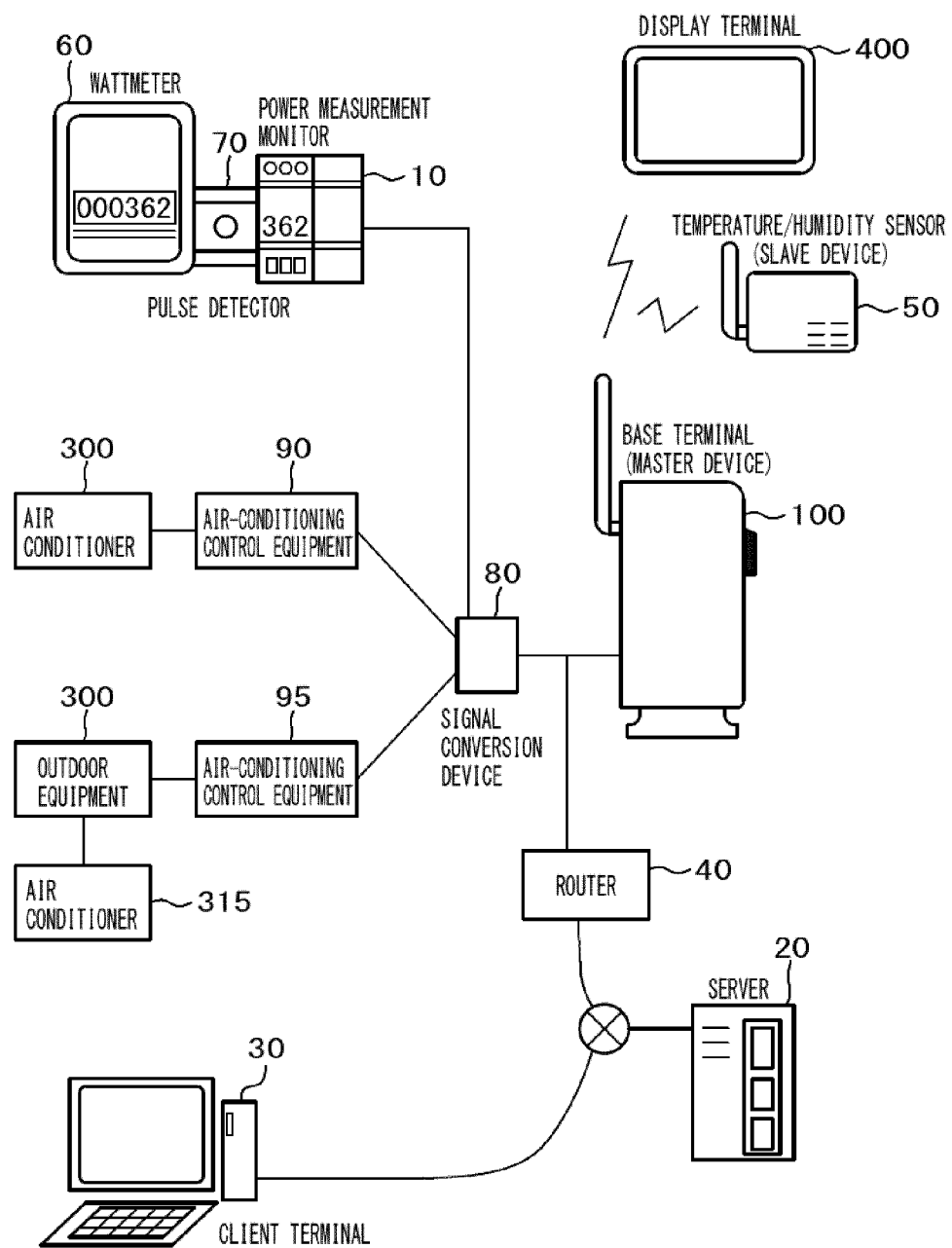

FIG. 5

SITE DEMAND MANAGEMENT TABLE

| SITE | DEMAND VALUE [Kwh] |
|---|---|
| A DEPARTMENT STORE SHINJUKU BRANCH | 200 |
| A DEPARTMENT STORE SHIBUYA BRANCH | 150 |
| A DEPARTMENT STORE HEAD OFFICE | 30 |

FIG. 6

SITE CONFIGURATION TABLE

| SITE | AREA | AIR-CONDITIONING CONTROL EQUIPMENT | TEMPERATURE/ HUMIDITY SENSOR |
|---|---|---|---|
| A DEPARTMENT STORE SHINJUKU BRANCH | FIRST-FLOOR SELLING SECTION | a, b, C | a |
| A DEPARTMENT STORE SHINJUKU BRANCH | FIRST-FLOOR OFFICE | d | b |
| A DEPARTMENT STORE SHIBUYA BRANCH | SECOND-FLOOR SELLING SECTION | e | c |
| A DEPARTMENT STORE SHIBUYA BRANCH | FIFTH-FLOOR OFFICE | f | d |

FIG. 7

AIR-CONDITIONING CONTROL SETTING TABLE

| SITE | PERIOD | TIME | AUTO-OFF | NON-OPERATION DAY | CONTROL SETTING NAME | CONTROL ORDER | OPERATION TIME POINT VALUE |
|---|---|---|---|---|---|---|---|
| A DEPARTMENT STORE SHINJUKU BRANCH | Jun 10–Sep 14 | 9:45~20:00 | VALID | WEDNESDAY | SHINJUKU BRANCH SUMMER SEASON | d, c, b, a | 90 |
| A DEPARTMENT STORE SHIBUYA BRANCH | Sep 15– Nov 9 | 10:00~20:00 | INVALID | WEDNESDAY | SHIBUYA BRANCH AUTUMN SEASON | d, c, b, a | 95 |

FIG. 8

TEMPERATURE CONTROL SETTING TABLE

| SITE | AREA | OPERATION SELECTION | LOWER LIMIT TEMPERATURE [°C] | TARGET TEMPERATURE [°C] | UPPER LIMIT TEMPERATURE [°C] |
|---|---|---|---|---|---|
| A DEPARTMENT STORE SHINJUKU BRANCH | FIRST-FLOOR SELLING SECTION | COOLING | 20 | 25 | 30 |
| A DEPARTMENT STORE SHINJUKU BRANCH | FIRST-FLOOR OFFICE | COOLING | 23 | 27 | 32 |

FIG. 9

BASE TERMINAL MANAGEMENT TABLE

| SITE | BASE TERMINAL | IP ADDRESS |
|---|---|---|
| A DEPARTMENT STORE SHINJUKU BRANCH | a | 172, 16, 0, 1 |
| A DEPARTMENT STORE SHIBUYA BRANCH | b | 172, 16, 1, 1 |

FIG. 10

AIR-CONDITIONING CONTROL CONDITION TABLE

| POWER THRESHOLD VALUE | TIME | AUTO-OFF | CONTROL ORDER |
|---|---|---|---|
| 180 | 9:45~20:00 | VALID | d, c, b, a |

FIG.11

TEMPERATURE CONTROL CONDITION TABLE

| AREA | OPERATION SELECTION | LOWER LIMIT TEMPERATURE[°C] | TARGET TEMPERATURE[°C] | UPPER LIMIT TEMPERATURE[°C] |
|---|---|---|---|---|
| FIRST-FLOOR SELLING SECTION | COOLING | 20 | 25 | 30 |
| FIRST-FLOOR OFFICE | COOLING | 23 | 27 | 32 |

FIG.12

AIR-CONDITIONING CONTROL EQUIPMENT CONFIGURATION TABLE

| AREA | AIR-CONDITIONING CONTROL EQUIPMENT |
|---|---|
| FIRST-FLOOR SELLING SECTION | a, b, c |
| FIRST-FLOOR OFFICE | d |

FIG.13

AIR-CONDITIONING CONTROL STATE MANAGEMENT TABLE

| AIR-CONDITIONING CONTROL EQUIPMENT | CONTROL ORDER | OPERATION STATE | OPERATION SELECTION |
|---|---|---|---|
| a | 4 | ON | COOLING |
| b | 3 | OFF | COOLING |
| c | 2 | OFF | COOLING |
| d | 1 | OFF | COOLING |

AIR-CONDITIONING OPERATION HISTORY TABLE

| AIR-CONDITIONING CONTROL EQUIPMENT | OPERATION TIME | OPERATION SELECTION |
|---|---|---|
| a | 2012. 8. 12<br>11:00～14:00 | COOLING |
| b | 2012. 8. 12<br>11:00～16:00 | COOLING |
| b | 2012. 8. 13<br>10:00～16:30 | COOLING |
| c | 2012. 8. 12<br>10:00～17:00 | COOLING |
| c | 2012. 8. 13<br>10:00～17:30 | COOLING |

FIG. 19A

AIR-CONDITIONING CONTROL IN COOLING OPERATION

| ROOM TEMPERATURE | | LOWER LIMIT TEMPERATURE 20°C | TARGET TEMPERATURE 25°C | UPPER LIMIT TEMPERATURE 30°C | |
|---|---|---|---|---|---|
| | | ~20 | 20~25 | 25~30 | 30~ |
| WHEN POWER CONSUMPTION > POWER THRESHOLD VALUE | | COOLING OFF (COOLING NOT NEEDED) | DEMAND CONTROL OPERATION (CONTROL TO REDUCE THE NUMBER OF AIR CONDITIONERS IN OPERATION AS MANY AS POSSIBLE WITHIN A RANGE NOT EXCEEDING UPPER LIMIT TEMPERATURE) | | COOLING ON (IN CONSIDERATION FOR ENVIRONMENT REGARDLESS OF EXCEEDING DEMAND TARGET) |
| WHEN POWER CONSUMPTION ≤ POWER THRESHOLD VALUE | | COOLING OFF (COOLING NOT NEEDED) | PARTIAL OPERATION (CONTROL TO REDUCE THE NUMBER OF AIR CONDITIONERS IN OPERATION AS MANY AS POSSIBLE WITHIN A RANGE NOT EXCEEDING TARGET TEMPERATURE) | COOLING ON (INCREASE THE NUMBER OF AIR CONDITIONERS IN OPERATION SO AS TO REACH TARGET TEMPERATURE) | |

FIG. 19B

AIR-CONDITIONING CONTROL IN HEATING OPERATION

| ROOM TEMPERATURE | LOWER LIMIT TEMPERATURE 14°C ~14 | TARGET TEMPERATURE 22°C 14~22 | UPPER LIMIT TEMPERATURE 24°C 22~24 | 24~ |
|---|---|---|---|---|
| WHEN POWER CONSUMPTION > POWER THRESHOLD VALUE | HEATING ON (IN CONSIDERATION FOR ENVIRONMENT REGARDLESS OF EXCEEDING DEMAND TARGET) | DEMAND CONTROL OPERATION (COTROL TO REDUCE THE NUMBER OF AIR CONDITIONERS IN OPERATION AS MANY AS POSSIBLE WITHIN A RANGE NOT FALLING BELOW LIMIT TEMPERATURE) | | HEATING OFF (HEATING NOT NEEDED) |
| WHEN POWER CONSUMPTION ≤ POWER THRESHOLD VALUE | HEATING ON (INCREASE THE NUMBER OF AIR CONDITIONERS IN OPERATION SO AS TO REACH TARGET TEMPERATURE) | | PARTIAL OPERATION (CONTROL TO REDUCE THE NUMBER OF AIR CONDITIONERS IN OPERATION AS MANY AS POSSIBLE WITHIN A RANGE NOT FALLING BELOW TARGET TEMPERATURE) | HEATING OFF (HEATING NOT NEEDED) |

FIG.20

AIR-CONDITIONING CONTROL SETTING — 400, 401

SITE [A DEPARTMENT STORE SHINJUKU BRANCH ▽]

[SETTING LIST]

| SETTING | PERIOD | TIME | AUTO-OFF | NON-OPERATION | CONTROL DETAILE SETTING | DELETE |
|---|---|---|---|---|---|---|
| 1 | JUN 10~SEP 14 | 9:45~20:00 | VALID | WED | SHINJUKU BRANCH SUMMER SEASON | ☑ |
| 2 | JUN 15~NOV 9 | 10:00~20:00 | INVALID | WED | SHINJUKU BRANCH AUTUMN SEASON | ☐ |
| 3 | NOV 10~MAR 19 | 10:00~20:00 | VALID | WED | SHINJUKU BRANCH WINTER SEASON | ☐ |

410 — 411 — 403 (DELETE)

[SETTING 1]    (ADD AS NEW SETTING) 404  (UPDATE) 405  (CLEAR) 406

- 421 PERIOD : [6] MONTH [10] DAY ~ [9] MONTH [14] DAY ~
- 422 TIME : [9] HOUR [45] MINUTE ~ [20] HOUR [00] MINUTE ~
- 423 AUTO-OFF : ◉ VALID   ○ INVALID   ※ AIR CONDITONER POWER SOURCE WILL BE TURNED OFF AT CLOSING TIME
- 424 NON-OPERATION DAY : ☐ SUN ☐ MON ☐ TUE ■ WED ☐ THURS ☐ FRI ☐ SAT
- 426 CONTROL DETAIL SETTING [SHINJUKU BRANCH SUMMER SEASON ▽]  (ADD) 428  (UPDATE/DELETE) 429
- 427 ※ SET ORDER AND OPERATION TIME POINT OF AIR CONDITIONER TO BE CONTROLLED

420

TEMPERATURE SETTING

| SELECT | CONTROL AREA | OPERATION SELECTION | LOWER LIMIT SELECTION | TARGET TEMPERATURE | UPPER LIMIT TEMPERATURE |
|---|---|---|---|---|---|
| ■ | FIRST-FLOOR SELLING SECTION | COOLING ▽ | 20 °C | 25 °C | 30 °C |
| ■ | FIRST-FLOOR OFFICE | COOLING ▽ | 20 °C | 27 °C | 32 °C |
| ☐ |  | ▽ | °C | °C | °C |

430 — 431

AIR-CONDITIONING CONTROL SYSTEM AND AIR-CONDITIONING CONTROL METHOD

TECHNICAL FIELD

The present invention relates to an air-conditioning control system and an air-conditioning control method and more particularly relates to an air-conditioning system and an air-conditioning control method which are favorable for supporting both of a reduction in electricity charges and establishment of a comfortable indoor environment by automatic control of air conditioners in high-voltage electricity-receiving entities.

BACKGROUND ART

In general, a high-voltage electricity receiving utility contracts with a power company and pays the electricity charges by setting a mean power for 30 minutes that electric power has been used the most in past one year as a contract demand (see Non-Patent Literature 1 and Non-Patent Literature 2). Therefore, it becomes important to suppress a demand value (a maximum demand power) in order to save the electricity charges.

In order to suppress this demand value, a demand controller has been widely used. This demand controller is a device for monitoring ever changing electric power used of the receiving entity and controlling a load system so as not to exceed a fixed value when it is estimated to exceed a set demand value.

For example, a system that automatically changes a set value of the demand controller is disclosed in Patent Literature 1.

In addition, a demand control system that selects an air conditioner to be stopped on the basis of order data of air conditioners is disclosed in Patent Literature 2.

In addition, air-conditioning control controllers capable of performing demand control are introduced in Non-Patent Literature 3 and Non-Patent Literature 4.

CITATION LIST

Patent Literature

PTL 1: Japanese Patent Application Laid-Open No. 2007-202277
PTL 2: Japanese Patent Application Laid-Open No. 2000-333368

Non-Patent Literature

Non-Patent Literature 1: Tokyo Electric Power Co. Inc., "Introduction of Demand Control System", [online], [Searched on March 15, Heisei 24], Internet <URL: http://www.tepco.co.jp/setsuden/business/demand-j.html>
Non-Patent Literature 2: Tohoku Electric Power Co. Inc., "Top page>Electricity charge->Information on contract electricity->[Institutional clients]->Information on contract->Contract demand", [online], [Searched on March 15, Heisei 24], Internet <URL: http://www.tohoku-epco.co.jp/dbusiness/service/rule.html>
Non-Patent Literature 3: Sanyo Electric Co. Ltd., catalogue "Air-Conditioning Integrated Monitoring System, STAIMS system", [online], [Searched on March 15, Heisei 24], Internet <URL: http://catalog.jp.sanyo.com/staims/pageview/data/target.pdf>
Non-Patent Literature 4: Sanyo Electronic Industry Co. Ltd., "Air-Conditioning Energy Saving System [ESSOR]", [online], [Searched on March 15, Heisei 24], Internet <URL: http://www.sdk-kk.co.jp/prd/essor/ESSOR_exp.html>

SUMMARY OF INVENTION

Technical Problem

The demand controllers for air-conditioners pertaining to prior art indicated in Non-Patent Literatures 3 and 4 each has a demand excess preventing function as follows in order to suppress the demand value.
(1) Energy Saving Mode for Air Conditioners
Time-zone-based equipment operation output and automatic-OFF times are set for every air conditioner.
(2) Peak Power Cutting Function
In a case where a previously set power value has been exceeded or is estimated to be exceeded, the operation of the air conditioner is restricted (it is stopped and the cooling/heating degree is reduced and so forth).

However, the demand controllers for air conditioners pertaining to the above-mentioned prior art had problems as follows.
(1) Since setting change is performed for every air conditioner, frequent setting change cannot be performed.
(2) Sudden room temperature rising/lowering occurs due to stoppage of air-conditioning and deterioration in work environment, adverse effects on stock and so forth associated therewith are feared.

The present invention has been made in order to solve the above-mentioned problems and an object thereof is to provide an air-conditioning control system that supports both of the reduction in electricity charges and establishment of the comfortable indoor environment by automatic control of the air conditioner, in particular, in high-voltage electricity receiving entities.

Solution to Problem

An air-conditioning control system according to the present invention has a power measurement monitor that measures an amount of power consumption of electric equipment installed in each site, a temperature/humidity sensor that measures a temperature and a humidity in an area that configures each site, an air-conditioner that is installed in the area that configures each site, air-conditioning control equipment that is connected to the air conditioner or outdoor equipment of the air conditioner to control the air conditioner or the outdoor equipment, a base terminal that receives measurement data of each site so installed and the area that configures that site from the power measurement monitor and the temperature/humidity sensor and is connected to the air-conditioning control equipment to transmit an air-conditioning control instruction to the air-conditioning control equipment and a server that is connected with the base terminal via a network and retains management information and air-conditioning control information of each site.

Then, the air-conditioning control information includes a target power value for demand control in each site and a lower limit temperature and an upper limit temperature in the area that configures each site and the base terminal receives the air-conditioning control information from the server, when a power consumption value in the site is greater than the target power value for demand control on the basis of the received air-conditioning control information, transmits a control instruction for turning the air conditioner OFF to the air-conditioning control equipment, and when a temperature measured in the area is greater than the upper limit temperature when the air conditioner is performing a cooling operation and when it is less than the lower limit temperature when the air conditioner is performing a heating operation, transmits a control instruction for turning the air conditioner ON thereto.

Further, the air-conditioning control information includes a target temperature, the base terminal, when the power consumption value in the site is greater than the target power value for demand control, and when the temperature measured in the area is set between the lower limit temperature and the upper limit temperature, the base terminal transmits a control instruction for partially suppressing the operation of the air conditioner in the area to the air-conditioning control equipment.

In addition, the air-conditioning control information includes information on date and time and when it corresponds to that information on date and time and when the power consumption value in the site is greater than the target power value for demand control, the base terminal transmits the control instruction for turning the air conditioner OFF to the air-conditioning control equipment.

Further, the air-conditioning control information includes the type of the air-conditioner operation of cooling/heating.

In addition, further, the air-conditioning control information includes control order related to the operation of the air conditioner in the site and the base terminal transmits the control instruction for turning the air conditioner OFF in order starting from the air conditioner that is higher in control order to the air-conditioning control equipment.

Advantageous Effects of Invention

According to the present invention, there can be provided the air-conditioning control system that supports both of the reduction in electricity charges and establishment of the comfortable indoor environment by automatic control of the air conditioners in the high-voltage electricity receiving entities, in particular.

BRIEF DESCRIPTION OF DRAWINGS

FIG. 1 is a system configuration diagram of an air-conditioning control system according to one embodiment of the present invention.

FIG. 5 is a diagram showing a site demand management table.

FIG. 6 is a diagram showing a site configuration table.

FIG. 7 is a diagram showing an air-conditioning control setting table.

FIG. 8 is a diagram showing a temperature control setting table.

FIG. 9 is a diagram showing a base terminal management table.

FIG. 10 is a diagram showing an air-conditioning control condition table.

FIG. 11 is a diagram showing a temperature control condition table.

FIG. 12 is a diagram showing an air-conditioning control equipment configuration table.

FIG. 13 is a diagram showing an air-conditioning control state management table.

FIG. 19A is a diagram showing an air-conditioning control deciding process in the base terminal in a cooling operation period.

FIG. 19B is a diagram showing an air-conditioning control deciding process in the base terminal in a heating operation period.

FIG. 20 is a diagram showing an air-conditioning control setting screen.

DESCRIPTION OF EMBODIMENTS

In the following, an embodiment of the present invention will be described by using FIG. 1 to FIG. 21B.

Embodiment 1

In the following, a first embodiment pertaining to the present invention will be described by using FIG. 1 to FIG. 21B.

First, a configuration of an air-conditioning control system according to one embodiment of the present invention will be described by using FIG. 1 to FIG. 3.

FIG. 1 is a system configuration diagram of the air-conditioning control system according to one embodiment of the present invention.

Figure 2:
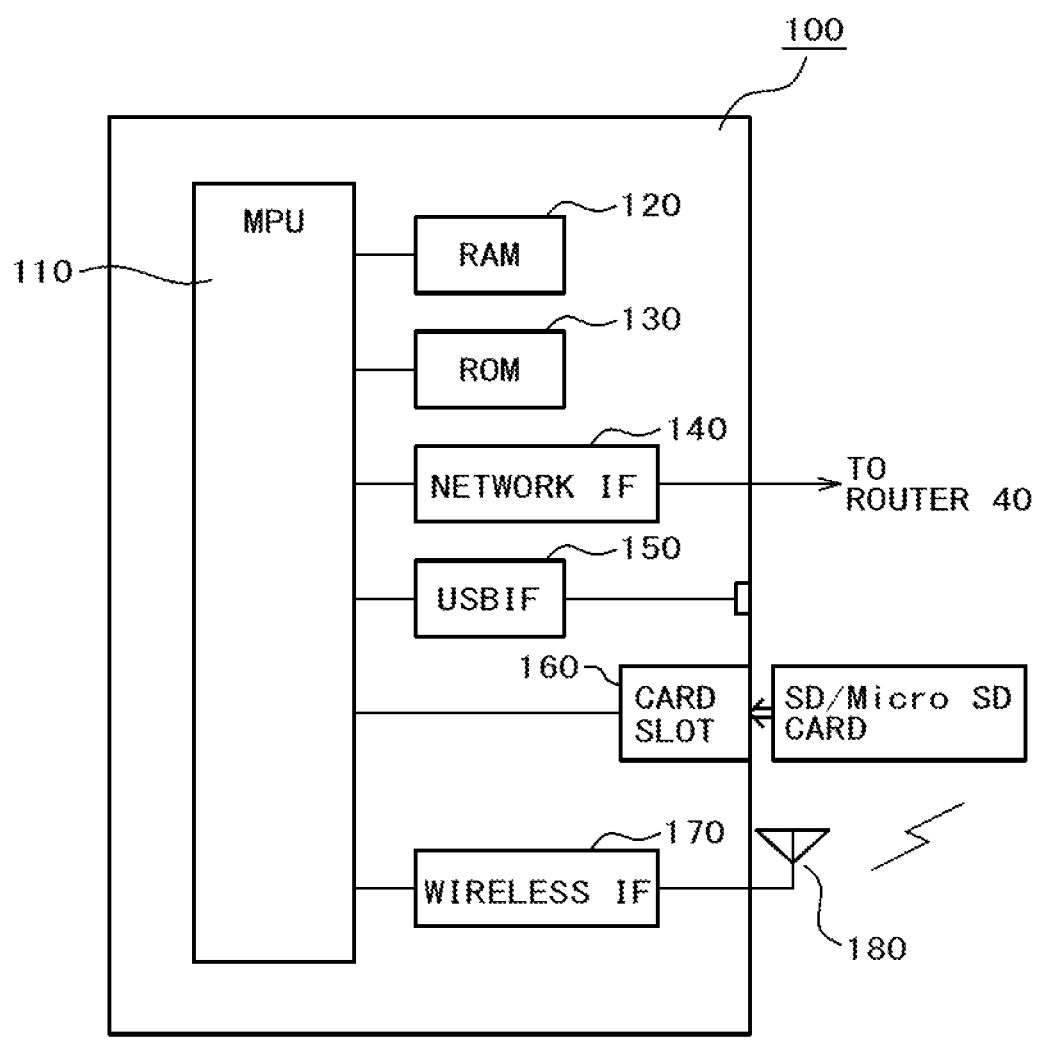
FIG. 2 is a block diagram showing a configuration of a base terminal according to one embodiment of the present invention.

FIG. 2 is a block diagram showing a configuration of a base terminal according to one embodiment of the present invention.

Figure 3:
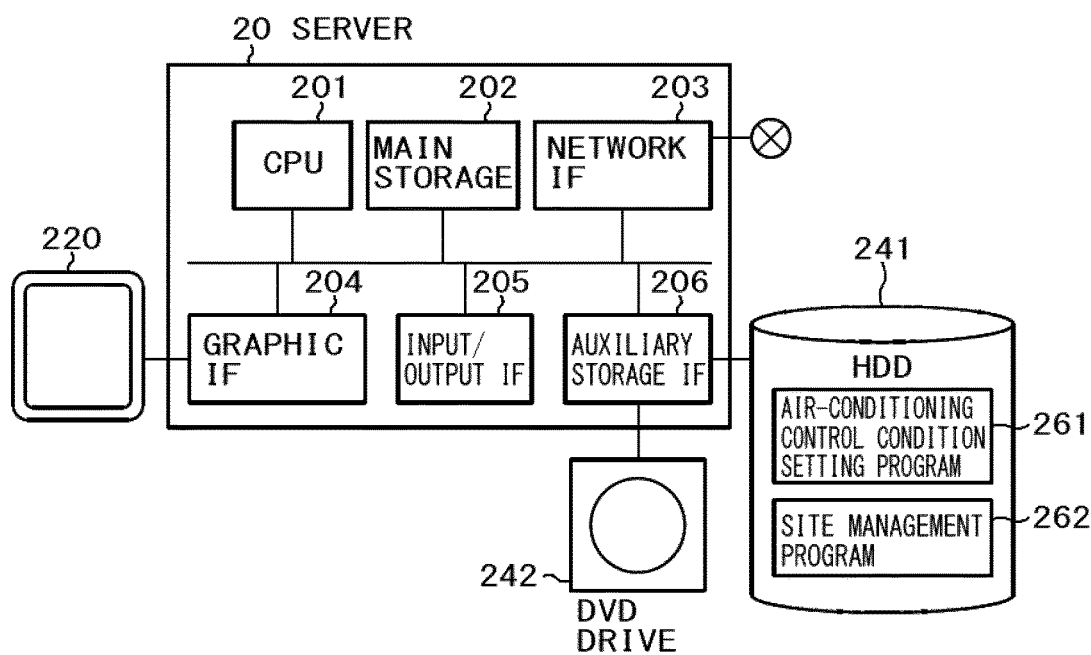
FIG. 3 is a block diagram showing a configuration of a server according to one embodiment of the present invention.

FIG. 3 is a block diagram showing a configuration of a server according to one embodiment of the present invention.

Here, it is assumed that power monitoring in the air-conditioning control system according to the present embodiment is managed by a unit which is called a site and an area is defined as a subdivision thereof. A concrete example thereof will be described in detail later.

The air-conditioning control system according to the present embodiment consists of a base terminal 100 (a master device), a power measurement monitor 10, a temperature/humidity sensor 50 (a slave device), a signal conversion device 80, air-conditioning control equipment 90, a display terminal 400, a pulse detector 70, a router 40, a client terminal 30, and a server 20 as shown in FIG. 1.

The base terminal 100 receives and stores electric power which is consumed for a fixed time in a facility from the power measurement monitor 10 and temperature and humidity from the temperature/humidity sensor 50 as measurement data and uploads the measurement data to the server 20 over the Internet. In addition, it transmits measurement data per fixed time to the display terminal 400. In the present embodiment, an interval that the measurement data is received from the power measurement monitor 10 and the temperature/humidity sensor 50 and an interval that the power amount is measured are assumed to be one minute. In addition, in the present embodiment, a period that the measurement data is uploaded to the server 20 is assumed to be 12 hours. The detailed configuration and operation of the base terminal 100 will be described in detail later.

Further, the base terminal 100 receives an air-conditioning control condition from the server and gives an instruction to the air-conditioning control equipment 90 in accordance with the power amount at a base measured by the power measurement monitor and a temperature condition from the temperature/humidity sensor 50 to control an air conditioner 300.

The power measurement monitor 10 transmits the measurement data that the power amount has been measured to the base terminal 100 via the signal conversion device 80 per minute. The signal conversion device 80 is a device that converts a serial interface into a network interface. The power measurement monitor is connected to the pulse detector 70 which has been installed on, for example, a wattmeter 60 and measures the power amount.

The temperature/humidity sensor 50 transmits the temperature and the humidity which have been measured per minute at an installation location to the base terminal 100 which is the master device.

The display terminal 400 is, for example, a general-purpose tablet PC and displays information on the power consumption amount, the temperature and the humidity in each site on the basis of the measurement data sent from the base terminal 100.

The router 40 is a device that connects the base terminal 100 to a network. The base terminal 100 is connected to the Internet by the router 40 to transmit the measurement data to the server 20 and to receive management information and the air-conditioning control condition from the server 20.

The server 20 receives an entry of the air-conditioning control condition of each site from the client terminal 30, stores the measurement data of the site and retains it as the management data of each site. In addition, it transmits the air-conditioning control condition of each site to the base terminal 100.

The client terminal 30 is a device for inputting the air-conditioning control condition of each site and gaining access to the management information in the server 20 to see the status of each site and is, for example, a general-purpose personal computer (hereinafter, referred to as a PC) which can be connected to the network.

Pieces of the air-conditioning control equipment 90 and 95 are devices for controlling the air conditioner 300 by receiving an instruction from the base terminal 100. As the air-conditioning control equipment according to the present embodiment, there are two types, the air-conditioning control equipment 90 of the type which is directly connected to the air conditioner 300 and the air-conditioning control equipment 95 of the type which is connected to outdoor equipment 305.

The air-conditioning control equipment 90 is connected to the air conditioner 300 and controls the air conditioner 300 by receiving the instruction from the base terminal 100. On the other hand, the air-conditioning control equipment 95 is connected to the outdoor equipment 305 and controls the air conditioner 300 by operating an air-conditioning function by the outdoor equipment 305 by receiving the instruction from the base terminal 100.

Next, a hardware configuration of the base terminal 100 will be described in detail.

The base terminal 100 consists of an MPU 110, a RAM 120, a ROM 130, a network IF 140, a USB IF 150, a card slot 160, a wireless IF 170 and an antenna 180 as shown in FIG. 2.

The MPU (Micro Processor Unit) 110 is a control unit and executes programs and performs various arithmetic operations to execute input/output commands on each unit.

The RAM (Random Access Memory) 120 is a main storage formed by a semiconductor and the programs to be executed by the MPU 110 and work data for arithmetic operations are retained therein.

The ROM (Read Only Memory) 130 is a memory for retaining the programs to be executed. A power and temperature/humidity management program and an air-conditioning control program are written into this ROM 130 upon manufacture of the device. Details of functions of the power and temperature/humidity management program and the air-conditioning control program will be described later.

Incidentally, the power and temperature/humidity management program and the air-conditioning control program may be periodically rewritten from the server 20 so as to be updated to the latest ones.

The network IF 140 is an interface for a wired network and is connected to the router 40 by, for example, Ethernet (a registered trademark). The base terminal 100 transmits the measurement data from each site to the client terminal 30 and transmits the measurement data to the server 20 all at once via this network IF 140. In addition, it receives the management information and the air-conditioning control condition of the site from the server 20 via this network IF 140.

The USB IF 150 is an interface for connecting USB (Universal Serial Bus) equipment. The USB is a general-purpose serial interface and is used for maintenance such as, for example, writing of an address of the server 20 and so forth in the base terminal 100 of the present embodiment.

The card slot 160 is a slot into which an SD/Micro SD memory card is to be inserted. The SD/Micro SD memory card is a memory card which has been standardized using a flash memory as a storage medium. The base terminal 100 of the present embodiment uses the SD/Micro SD memory card which has been inserted into this card slot 160 as an auxiliary storage and the measurement data from each site and necessary tables are retained in the SD/Micro SD memory card.

The wireless IF 170 is an interface for transmitting/receiving radio waves to/from the antenna 180 to perform wireless communication. As the wireless communication, communication based on a standard such as, for example, IEEE802.11b, Bluetooth (a registered trademark) having a frequency band of 2.4 GHz can be used. The base terminal 100 of the present embodiment collects the measurement data from the slave device installed in each site and transmits the measurement data and necessary information to the display terminal 400 via this wireless IF 170.

Next, a hardware configuration of the server 20 will be described in detail.

The server 20 is implemented by a general computer and has a form that a CPU (Central Processing Unit) 201, a main storage 202, a network IF 203, a graphic IF 204, an input/output IF 205, and an auxiliary storage IF 206 are coupled together via a bus as shown in FIG. 3.

The CPU 201 controls each unit of the server 20 and loads and executes a necessary program in the main storage 202.

The main storage 202 is generally configured by a volatile memory such as a RAM and so forth and the programs that the CPU 201 executes and data to be referred to are stored therein.

The network IF 203 is an interface used for connection with the Internet on the outside.

The graphic IF 204 is an interface for connecting a display device 220 such as an LCD (Liquid Crystal Display) and so forth.

The input/output IF 205 is an interface for connecting an input/output device.

The auxiliary storage IF 206 is an interface for connecting auxiliary storages such as an HDD (Hard Disk Drive) 241, a DVD drive (Digital Versatile Disk) 242 and so forth.

The HDD 241 has a large storage capacity and the programs for executing the present embodiment are stored therein.

In general, the server 20 configures RAID for data security and at the request for regular operation. In addition, although not shown in the drawing, it is also possible to connect a dedicated large-capacity storage device thereto.

An air-conditioning control condition setting program 261 and a site management program 262 are stored in the HDD 241 of the present embodiment.

Details of the functions of the air-conditioning control condition setting program 261 and the site management program 262 will be described later.

The DVD drive 242 is a device that writes data into an optical disk such as a DVD, a CD and so forth and reads the data out of the optical disk and can install a program provided from, for example, a CD-ROM into the server 20.

The server 20 of the present embodiment is adapted to execute each function by installing the necessary program into such a computer as mentioned above.

Next, a model of the air-conditioning control system of the present embodiment will be described by using FIG. 4.

Figure 4:
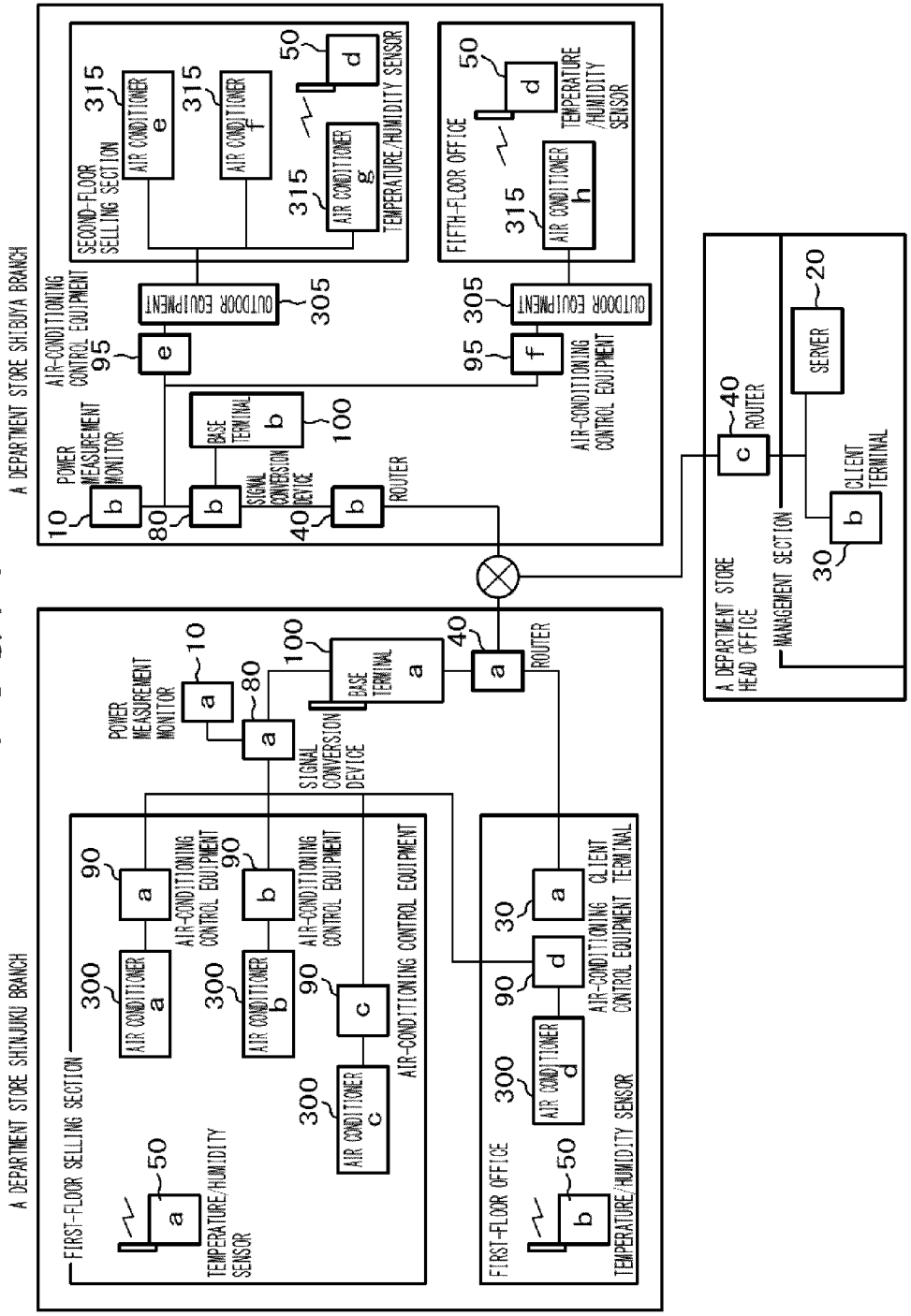
FIG. 4 is a diagram showing a model of the air-conditioning control system according to one embodiment of the present invention.

FIG. 4 is a diagram showing the model of the air-conditioning control system according to one embodiment of the present invention.

As the model of the air-conditioning control system of the present embodiment, a model that areas which are called a first-floor selling section and a first-floor office (hereinafter, referred to as a "first-floor selling section area" and so forth and also the others are the same) are included in a site which is called an A Department Store Shinjuku Branch (hereinafter, referred to as an "A Department Store Shinjuku Branch site" and so forth and also the others are the same), a second-floor selling section area and a fifth-floor office area are included in an A Department Store Shibuya Branch site and a management section area is included in an A Department Store Head Office site is assumed as shown in FIG. 4.

A temperature/humidity sensor a50, an air conditioner a300, an air conditioner b300, an air conditioner c300, air-conditioning control equipment a90, air-conditioning control equipment b90 and air-conditioning control equipment c90 are included in the first-floor selling section area of the A Department Store Shinjuku Branch site.

In addition, a temperature/humidity sensor b50, an air conditioner d300, air-conditioning control equipment d90 and a client terminal a30 are included in the first-floor office area of the A Department Store Shinjuku Branch site.

A base terminal a100 and a power measurement monitor a10 are installed in the A Department Store Shinjuku Branch site. Then, it is connected to the base terminal a100 via a signal conversion device a80 in the first-floor selling section site. In addition, the base terminal a100 is connected to the network via a router a40 such that it can communicate with the server 20 in the management section area 20 of the A Department Store Head office site.

The temperature/humidity sensor a50 which is present in the first-floor selling section area of the A Department Store Shinjuku Branch site transmits data on the measured temperature and humidity to the base terminal 100 by wireless.

In addition, the power is measured by the power measurement monitor 10 and is transmitted to the base terminal 100 via the signal conversion device 80.

The base terminal 100 sends the measurement data on the temperature and humidity and the measurement data on the power so transmitted thereto with the server 20 in the management section area 20 of the A Department Store Head Office site and controls the air-conditioning control equipment a90, the air-conditioning control equipment b90 and the air-conditioning control equipment c90 in the first-floor selling section area and the air-conditioning control equipment d90 in the first-floor office area on the basis of the air-conditioning control condition sent from the server 20. Here, it is assumed that a unit that the base terminal 100 controls the air-conditioning equipment is a unit of one area.

In addition, the air-conditioning control condition is input through the client terminal a30 in the first-floor office area of the A Department Store Shinjuku Branch site to be transmitted to the server 20 of the management section area 20 of the A Department Store Head Office site via the router 40 and site management information is received from the server 20 to be displayed thereon.

The router 40 is installed in the A Department Store Head Office site and a client terminal b30 and the server 20 are installed in the management section area.

The server 20 receives the air-conditioning control condition which has been input through the client terminal 30 in each area and transmits it to each base terminal 100 via a router c40. In addition, it receives a request for display of the site management information from the client terminal 30 in each area and transmits the management information thereto via the router c40. The function of the client terminal b30 is the same as the function of the client terminal a30.

On the other hand, a temperature/humidity sensor c50, outdoor equipment a305, an air conditioner e315, an air conditioner f315, an air conditioner g315 and air-conditioning control equipment e95 are included in the second-floor selling section area of the A Department Store Shibuya Branch site.

In addition, a temperature/humidity sensor d50, outdoor equipment b, an air conditioner h300 and air-conditioning control equipment f95 are included in the fifth-floor office area of the A Department Store Shibuya Branch site.

A base terminal b100 and a power measurement monitor b10 are installed in the A Department Store Shibuya Branch site. Then, they are connected to the base terminal b100 via a signal conversion device b80 in the second-floor selling section area. In addition, the base terminal b100 is connected to the network via a router b40 such that it can communicate with the server 20 in the management section area 20 of the A Department Store Head Office site.

Although the function of each piece of equipment of the A Department Store Shibuya Branch site is almost the same as that of the A Department Store Shinjuku Branch site, it is different therefrom in the point that the air-conditioning control equipment e95 indirectly controls the functions of the air conditioner e315, the air conditioner f315 and the air conditioner g315 by controlling the outdoor equipment a305 and the air-conditioning control equipment f95 indirectly controls the function of an air conditioner h315 by controlling outdoor equipment b305.

The A Department Store Shinjuku Branch site and the A Department Store Shibuya Branch site are common in the point that each area is one air-conditioning control unit. However, they are different from each other in the point that although in the A Department Store Shinjuku Branch site, separate control of the individual air conditioner a300, air conditioner b300 and air conditioner c300 in one area is possible, in the A Department Store Shibuya Branch site, since the air-conditioning control equipment e95 controls the outdoor equipment a305, separate control of the individual air conditioner e315, air conditioner f315 and air conditioner g315 is not possible.

Next, data structures according to the present embodiment will be described on the basis of the model of the above-mentioned system by using FIG. 5 to FIG. 14.

FIG. 5 is a diagram showing a site demand management table.

FIG. 6 is a diagram showing a site configuration table.

FIG. 7 is a diagram showing an air-conditioning control setting table.

FIG. 8 is a diagram showing a temperature control setting table.

FIG. 9 is a diagram showing a base terminal management table.

FIG. 10 is a diagram showing an air-conditioning control condition table.

FIG. 11 is a diagram showing a temperature control condition table.

FIG. 12 is a diagram showing an air-conditioning control equipment configuration table.

FIG. 13 is a diagram showing an air-conditioning control state management table.

Figures 14, 15:
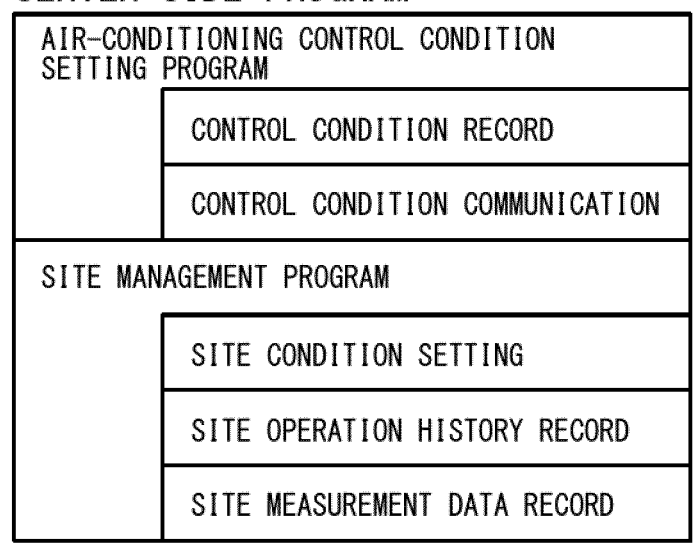
FIG. 14 is a diagram showing an air-conditioning operation history table.
FIG. 15 is a diagram showing a program configuration on the server side.

FIG. 14 is a diagram showing an air-conditioning operation history table.

Here, the site demand management table, the site configuration table, the air-conditioning control setting table, the temperature control setting table and the base terminal management table in FIG. 5 to FIG. 9 are tables to be retained in the server 20, and the air-conditioning control condition table, the temperature control condition table, the air-conditioning control equipment configuration table, the air-conditioning control state management table and the air-conditioning operation history table in FIG. 10 to FIG. 14 are tables to be retained in the base terminal 100.

The site demand management table is the table for retaining a demand value which presents a target in each site and consists of fields of "Site" and "Demand Value" as shown in FIG. 5. Here, the demand value which presents the target is a maximum demand power (an average power in 30 minutes) that a power recipient aims to attain as a standard for management.

The site configuration table is the table for showing a configuration of each site and consists of the respective fields of "Site", "Area", "Air-Conditioning Control Equipment" and "Temperature/Humidity Sensor" as shown in FIG. 6. For example, in this example, it is shown that pieces of air-conditioning equipment a, b and c and a temperature/humidity sensor a are present in the first-floor selling section area of the A Department Store Shinjuku Branch site.

The air-conditioning control setting table is the table for storing power control conditions that a user has set and consists of the respective fields of "Site", "Period", "Time", "Auto-OFF", "Non-Operation Day", "Control Setting Name", "Control Order" and "Operation Time Point Value" as shown in FIG. 7.

"Site" indicates a site to which this setting is applied. "Control Setting Name" is a name that the user has input for unique discrimination of the setting of this record (described later). "Period" and "Time" indicate a period and a time for performing the operation of the air conditioner. "Auto-OFF" is a flag indicating whether air-conditioning is automatically turned OFF when the designated period and time have expired, and when it is "Valid", it indicates that air-conditioning is automatically turned OFF when the designated period and time have expired and when it is "Invalid", it indicates that air-conditioning is not automatically turned OFF when the designated period and time have expired. "Non-Operation Day" is adapted to indicate a day that air-conditioning is not operated even in the designated period and time in terms of a day of the week.

"Control Order" indicates the order of priority that a demand control operation of the air-conditioning control equipment is performed and it is assumed that the demand control operation is performed starting from the air-conditioning control equipment which is higher in order of priority.

"Operation Time Point Value" is a value indicating whether the demand control operation is performed when it has reached what percent of the demand value shown in FIG. 5.

For example, in this example, the setting that the control setting name is "Shinjuku Branch Summer Season" relates to the A Department Store Shinjuku Branch site and indicates that the operation is performed for the time from 9:45 to 20:00 in the period from June 10 to September 14, the auto-OFF is set to "Valid", the non-operation day in that period is Wednesday, the pieces of air-conditioning control equipment are subjected to the demand control operation in order of d, c, b and a, and the demand control operation is started when it has reached 90 percent of the demand value.

The temperature control setting table is the table for storing temperature control conditions that the user has set and consists of the respective fields of "Site", "Area", "Operation Selection", "Lower Limit Temperature", "Target Temperature" and "Upper Limit Temperature" as shown in FIG. 8.

"Site" and "Area" indicate the site and the area to which this setting is applied. "Operation Selection" indicates whether the air conditioner is set to a cooling operation or a heating operation. "Lower Limit Temperature" and "Upper Limit Temperature" are temperatures set as a lower limit and an upper limit serving as a standard based on which it is turned ON/OFF when performing the air-conditioning operation, and "Target Temperature" is a temperature which has been set as a target so as to approach this temperature. Incidentally, a relation among "Lower Limit Temperature", "Upper Limit Temperature", "Target Temperature" and air-conditioning control will be described in detail later.

The base terminal management table is the table for storing an IP address of the base terminal 100 in each site and consists of the respective fields of "Site", "Base Terminal" and "IP Address" as shown in FIG. 9. In this example, it is indicated that the IP address of the base terminal of the A Department Store Shinjuku Branch is 172.16.0.1.

The air-conditioning control condition table is the table for storing the air-conditioning control conditions sent from the server 20 and consists of the respective fields of "Power Threshold Value", "Time" and "Auto-OFF" as shown in FIG. 10. Incidentally, in this example, it is assumed that the air-conditioning control conditions are transmitted from the server 20 to the base terminal 100 once a day on the day before.

"Power Threshold Value" indicates a value that the demand control operation of the air-conditioning control equipment is performed when the power consumption in the site has exceeded this value. It is indicated that "Time" is the time for the air-conditioning operation, "Auto-OFF" is the flag indicating whether air-conditioning is automatically turned OFF when the designated period and time have expired, and "Control Order" is the order of priority that the demand control operation of the air-conditioning control equipment is performed, respectively.

Incidentally, there is a relation of the power threshold value=the demand value×the operation time point value/100.

The temperature control condition table is the table for storing, in particular, values relevant to the temperature in the air-conditioning control conditions sent from the server 20 and consists of the respective fields of "Area", "Operation Selection", "Lower Limit Temperature", "Target Temperature" and "Upper Limit Temperature" as shown in FIG. 11. "Area" indicates the area to which this setting is applied. Meanings of "Operation Selection", "Lower Limit Temperature", "Target Temperature" and "Upper Limit Temperature" are the same as those in FIG. 8. Incidentally, in this example, it is assumed that the air-conditioning control conditions are transmitted from the server 20 to the base terminal 100 once a day on the day before.

The air-conditioning control equipment configuration table is the table for showing the configuration of the air-conditioning control equipment 300 in the area and consists of the respective fields of "Area" and "Air-Conditioning Control Equipment" as shown in FIG. 12.

In this example, it is indicated that the pieces of air-conditioning control equipment a, b and c are installed in the first-floor selling section area.

The air-conditioning control state management table is the table for showing the state of current air-conditioning control and consists of the respective fields of "Air-Conditioning Control Equipment", "Control Order", "Operation State" and "Operation Selection" as shown in FIG. 13.

In this example, it is indicated that the control order of the air-conditioning control equipment a in the area is the fourth and the operation is being performed by cooling.

The air-conditioning operation history table is the table for showing the history of ever performed air-conditioning operations and consists of the respective fields of "Air-Conditioning Control Equipment", "Operation Period" and "Operation Selection" as shown in FIG. 14.

In this example, it is indicated that the air-conditioning equipment has performed the cooling operation from 11:00 to 14:00 on Aug. 12, 2012.

Next, functions of software of the air-conditioning control system according to one embodiment of the present invention will be described by using FIG. 15 and FIG. 16.

FIG. 15 is a diagram showing a program configuration on the server side.

Figure 16:
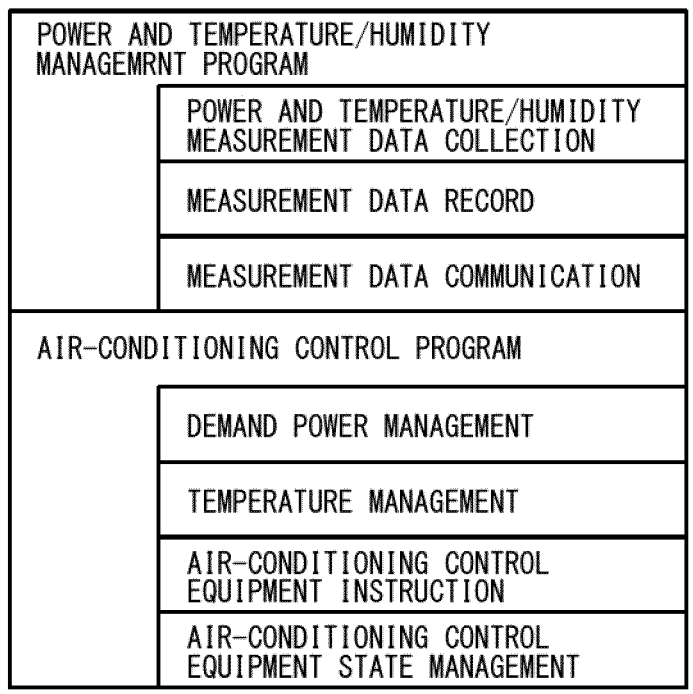
FIG. 16 is a diagram showing a program configuration on the base terminal side.

FIG. 16 is a diagram showing a program configuration on the base terminal side.

As programs to be stored in the HDD 241 of the server 20, there exist an air-conditioning control condition setting program and a site management program as shown in FIG. 15.

The air-conditioning control condition setting program has a control condition recording function and a control condition communication function. The control condition recording function is a function of receiving and recording the air-conditioning control condition from the client terminal 30. The control condition communication function is a function of communicating the air-conditioning control condition to the base terminal 100.

The site management program has a site condition setting function, a site operation history recording function and a site measurement data recording function. The site condition setting function is a function adapted to set the air-conditioning control condition of each site by the client terminal 30. The site operation history recording function is a function of receiving and recording the history of the air-conditioning operations from each site. The site measurement data recording function is a function of receiving and recording the measurement data from each site. As programs to be stored into the ROM 130 of the base terminal 100 or the SD/Micro SD memory card, there exist a power and temperature/humidity management program and an air-conditioning control program as shown in FIG. 16.

The power and temperature/humidity management program has a power and temperature/humidity measurement data collecting function, a measurement data storing function and a measurement data communication function. The power and temperature/humidity measurement data collecting function is a function of collecting the measurement data on the power from the power measurement monitor 10 and the measurement data on the temperature and humidity from the temperature/humidity sensor 50. The measurement data recording function is a function of recording the measurement data on the power and the temperature/humidity which has been transmitted thereto into the SD/Micro SD card. The measurement data communication function is a function of transmitting the measurement data to the server 20.

The air-conditioning control program has a demand power managing function, a temperature managing function, an air-conditioning control equipment instructing function and an air-conditioning control equipment state managing function.

The demand power managing function is a function of suppressing the operation of the air conditioner when the power consumption has been increased up to a set percentage of the demand value. The temperature managing function is a function of controlling the operation of the air conditioner so as to reach the set temperature. The air-conditioning control equipment instructing function is a function of giving an instruction to the air-conditioning control equipment. The air-conditioning control equipment state managing function is a function of retaining the operation history of the air conditioner and transmitting it to the server 20. Next, the operation of the air conditioning control system according to one embodiment of the present invention and a data flow in each unit will be described by using FIG. 17 and FIG. 18.

Figure 17:
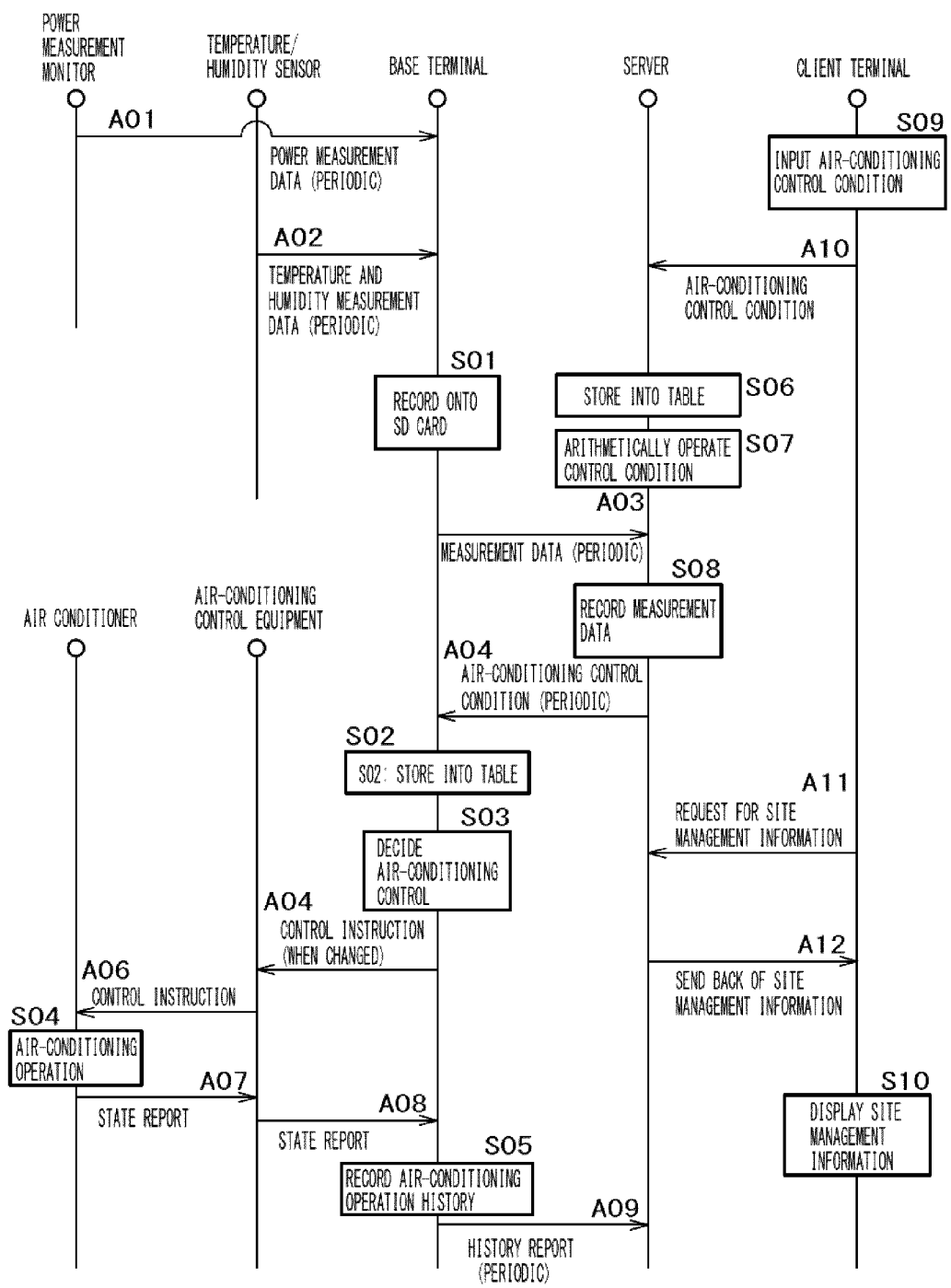
FIG. 17 is a timing chart showing processes of respective units and information to be exchanged of the air-conditioning control system according to one embodiment of the present invention.

FIG. 17 is a timing chart showing processes of respective units and information to be exchanged in the air-conditioning control system according to one embodiment of the present invention.

Figure 18:
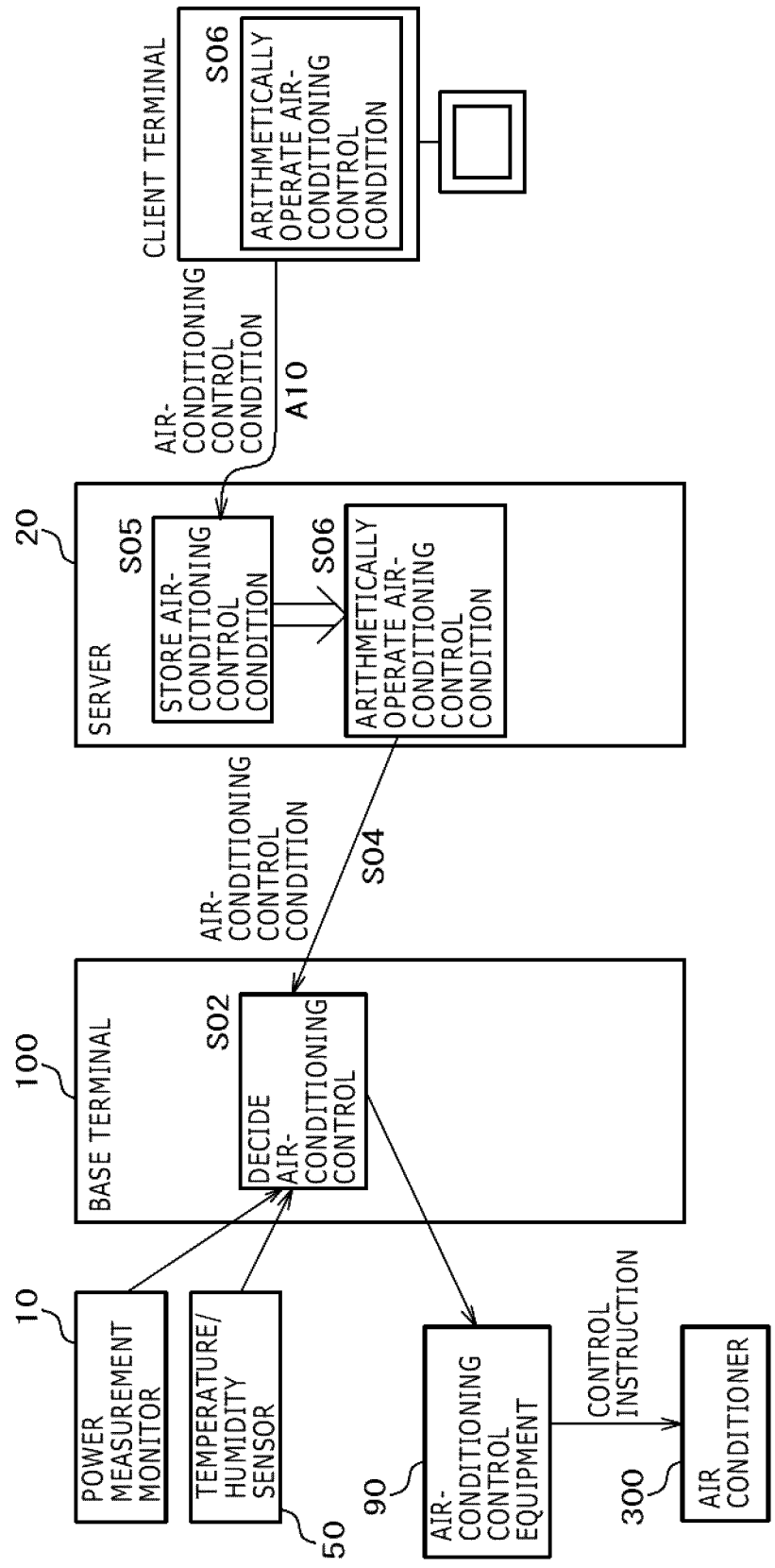
FIG. 18 is a data flow diagram showing in detail functions particularly related to air-conditioning control of the air-conditioning control system according to one embodiment of the present invention.

FIG. 18 is a data flow diagram showing in detail places which are particularly relevant to the air-conditioning control in the air-conditioning control system according to one embodiment of the present invention.

First, the power measurement monitor 10 which is shown in FIG. 1 transmits the measurement data on the power to the base terminal 100 (A01).

In parallel with that, the temperature/humidity sensor 50 transmits the measurement data on the temperature and humidity to the base terminal 100 by wireless (A02).

Transmission of these pieces is performed together periodically, for example, per minute.

The base terminal 100 stores the measurement data received from the power measurement monitor 10 and the temperature/humidity sensor 50 into the SD/Micro SD card (S01).

Next, the base terminal 100 periodically transmits the measurement data via the network (A03).

In the server 20, the measurement data transmitted from the base terminal 100 is recorded (S08).

At the stage before the measurement data is recorded, the user inputs the air-conditioning control condition through the client terminal 30 (S09).

The input air-conditioning control condition is transmitted from the client terminal 30 to the server 20 (A10).

In the server 20, the air-conditioning control condition so transmitted thereto is stored into the air-conditioning control setting table shown in FIG. 7 and the temperature control setting table shown in FIG. 8 (S06).

Next, a necessary air-conditioning control condition is arithmetically operated by obtaining the power threshold value and so forth by multiplying together the demand value in the site demand management table shown in FIG. 5 and the operation time point value in the air-conditioning control setting table shown in FIG. 7 (S07).

Then, the server 20 transmits the received and arithmetically operated air-conditioning control condition to the base terminal 100 (A04). This transmission is transmitted on the day before an objective day and the frequency thereof is once a day.

In the base terminal 100, the air-conditioning control condition so transmitted thereto is stored into the air-conditioning control condition table shown in FIG. 10 and the temperature control condition table shown in FIG. 11 (S02).

Next, the base terminal 100 makes a decision as to the air-conditioning control on the basis of the values stored in the air-conditioning control condition table and the temperature control condition table (S03). A concrete deciding method will be described in detail later.

Then, the base terminal 100 issues a control instruction to the air-conditioning control equipment 90 with reference to the air-conditioning control state management table in FIG. 13 and on the basis of a result of decision in S03 when issuance of the control instruction has become necessary due to a change in state and so forth (A05).

The air-conditioning control equipment 90 receives the control instruction from the base terminal 100 and performs the control instruction on the air conditioner 300 (A06), and on the basis of which the air conditioner 300 performs the air-conditioning operation (S04).

Then, the air conditioner 300 reports the state such as "Normal", "Abnormal" and so forth to the air-conditioning control equipment 90(A07) and on the basis of which the air-conditioning control equipment 90 reports the state to the base terminal (A08).

The base terminal 100 stores the operation state into the air-conditioning operation history table shown in FIG. 14 on the basis of the state report from the air-conditioning control equipment 90 (S05).

Then, the history of the air-conditioning operations is transmitted from the base terminal 100 to the server 20 periodically, for example, once a day (A09).

Incidentally, although the case of the A Department Store Shinjuku Branch site has been shown in the above, the case of the A Department Store Shibuya Branch site is the same as the above except that the control flows along the base terminal 100→the air-conditioning control equipment 95→the outdoor equipment 305→the air conditioner 315.

In addition, when the site management information has been requested from the client terminal 30 (A11), the server 30 transmits the site management information to the client terminal 30 (A12) and the client terminal 30 displays it (S10).

As the site management information, there are the histories of the amount of power consumption and the temperature/humidity in the site, the air-conditioning control condition which is being currently set to the site, the history of the air-conditioning operations, the configuration information of the site and so forth.

Next, details of air-conditioning control deciding processes in the base terminal will be described by using FIG. 19A and FIG. 19B.

FIG. 19A is a diagram showing the air-conditioning control deciding process in the base terminal in a cooling operation period.

FIG. 19B is a diagram showing the air-conditioning control deciding process in the base terminal in a heating operation period.

In a case of the cooling operation period, here, it is assumed that the lower limit temperature is 20° C., the target temperature is 25° C. and the upper limit temperature is 30° C. as shown in FIG. 19A.

(1) When the power consumption>the power threshold value (the power consumption>the demand value×the demand target value/100)

When the room temperature<the lower limit temperature, cooling is not necessary. At that time, the base terminal 100 controls the air-conditioning control equipment 90 so as to turn the cooling OFF.

When the lower limit temperature≤the room temperature<the upper limit temperature, it controls to reduce the number of air conditioners in operation as many as possible until it reaches the upper limit temperature. That is, in a case where there exist the plurality of air conditioners in the area, the base terminal 100 gives a control instruction to the air-conditioning control equipment 90 so as to operate only some of them and to intermittently operate the air conditioners. When the control order of the air conditioners is designated, when they are to be turned OFF, the air conditioners are turned OFF starting from the one which is higher in control order, in contrast, when they are to be turned ON, the air conditioners are turned ON starting from the one which is higher in control order and the conditioner which is longer in OFF-controlled period.

When the upper limit temperature<the room temperature, the base terminal 100 gives an control instruction to the air-conditioning control equipment 90 so as to turn the cooling ON in consideration of the environment in an air-conditioner installation location even when it exceeds the demand target. (2) When the power consumption≤the power threshold value (the power consumption≤the demand value× the demand target value/100)

When the room temperature<the lower limit temperature, the cooling is not necessary. At that time, the base terminal 100 gives an instruction to the air-conditioning control equipment 90 so as to turn the cooling OFF.

When the lower limit temperature≤the room temperature, it controls to reduce the number of air-conditioners in operation as many as possible within a range not exceeding the target temperature. In a case where there exist the plurality of air conditioners in the area, the base terminal 100 gives the control instruction to the air-conditioning control equipment 90 so as to operate only some of them and to intermittently operate the air conditioners. When the control order of the air conditioners is designated, when they are to be turned OFF, the air conditioners are turned OFF starting from the one which is higher in control order, in contrast, when they are to be turned ON, the air conditioners are turned ON starting from the one which is higher in control order and the conditioner which is longer in OFF-controlled period.

In a case of the room temperature the target temperature, the base terminal 100 gives an instruction to the air-conditioning control equipment 90 so as to increase the number of air conditioners in operation such that it reaches the target temperature.

On the other hand, in a case of the heating operation period, it becomes dual to the case of cooling with respect to temperature control. Here, it is assumed that the lower limit temperature is 14° C., the target temperature is 22° C. and the upper limit temperature is 24° C. as shown in FIG. 19B.

(1) When the power consumption>the power threshold value (the power consumption>the demand value×the demand target value/100)

When the room temperature<the lower limit temperature, the base terminal 100 gives a control instruction to the air-conditioning control equipment 90 so as to turn heating ON in consideration of the environment of the air conditioner installation location even when it exceeds the demand target.

When the lower limit temperature≤the room temperature the upper limit temperature, it controls so as to reduce the number of air conditioners in operation as many as possible until it reaches the lower limit temperature. That is, in a case where there exist the plurality of air conditioners in the area, the base terminal 100 gives the control instruction to the air-conditioning control equipment 90 so as to operate only some of them and to intermittently operate the air conditioners. When the control order of the air conditioners is designated, when they are to be turned OFF, the air-conditioners are turned OFF starting from the one which is higher in control order, in contrast, when they are to be turned ON, the air conditioners are turned ON starting from the one which is higher in control order and the air conditioner which is longer in OFF controlled period.

When the upper limit temperature<the room temperature, heating is not necessary. At that time, the base terminal 100 gives a control instruction to the air-conditioning control equipment 90 so as to turn the heating OFF.

(2) When the power consumption≤the power threshold value (the power consumption≤the demand value×the demand target value/100)

When the room temperature≤the target temperature, it is held in the demand target and therefore the base terminal 100 gives a control instruction to the air-conditioning control equipment 90 so as to increase the number of air conditioners in operation until it reaches the target temperature.

When the target temperature≤the room temperature≤the upper limit temperature, it controls so as to reduce the number of air conditioners in operation as many as possible until it reaches the upper limit temperature. In a case where there exist the plurality of air conditioners in the area, the base terminal 100 gives the control instruction to the air-conditioning control equipment 90 so as to operate only some of them and to intermittently operate the air conditioners. When the control order of the air conditioners is designated, when they are to be turned OFF, the air conditioners are turned OFF starting from the one which is higher in control order, in contrast, when they are to be turned ON, the air conditioners are turned ON starting from the one which is higher in control order and the conditioner which is longer in OFF-controlled period.

When the upper limit temperature<the room temperature, the heating is not necessary. At that time, the base terminal 100 gives the control instruction to the air-conditioning control equipment 90 so as to turn the heating OFF.

Next, a user interface of the air-conditioning control system according to one embodiment of the present invention will be described by using FIG. 20 to FIG. 21B.

FIG. 20 is a diagram showing an air-conditioning control setting screen.

Figure 21A:
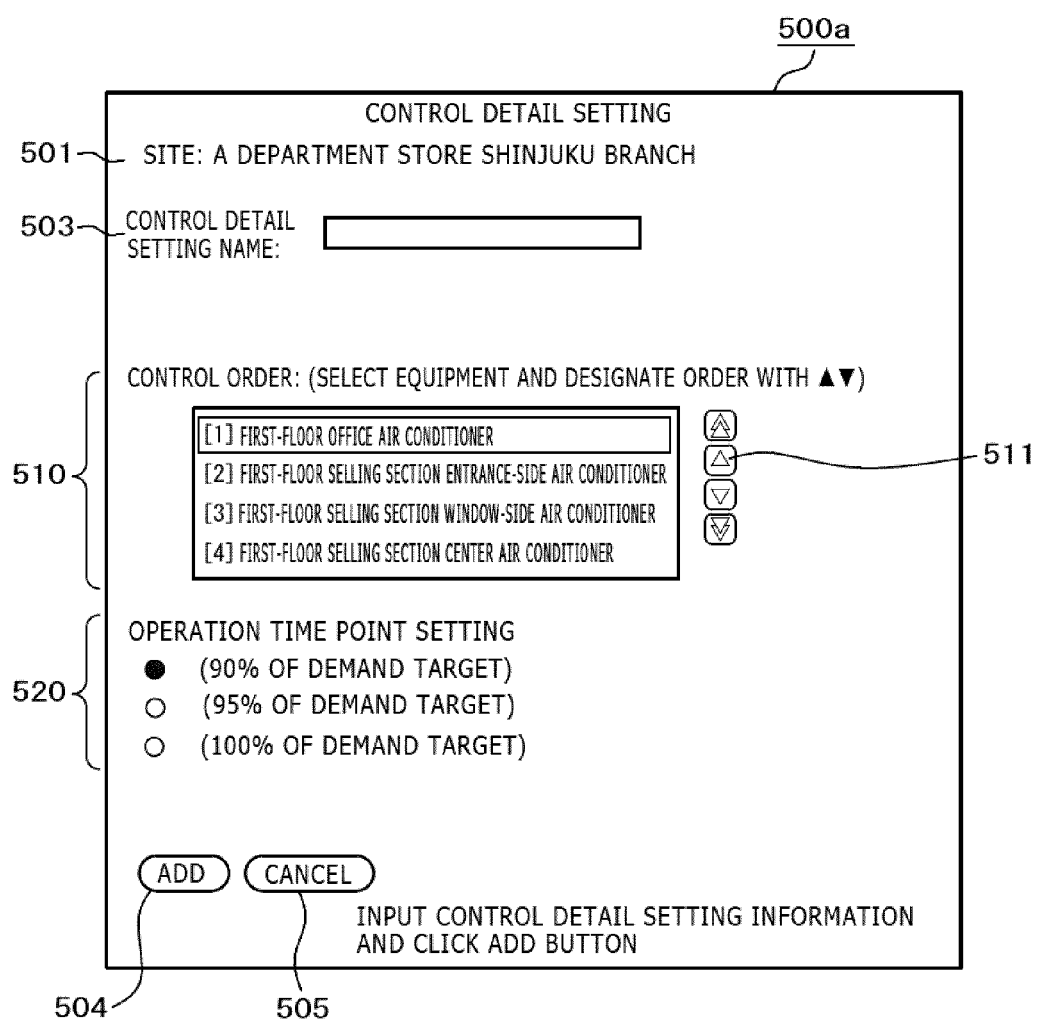
FIG. 21A is a diagram showing an air-conditioning control detail setting screen to be displayed upon addition.

FIG. 21A is a diagram showing an air-conditioning control detail setting screen to be displayed upon addition.

Figure 21B:
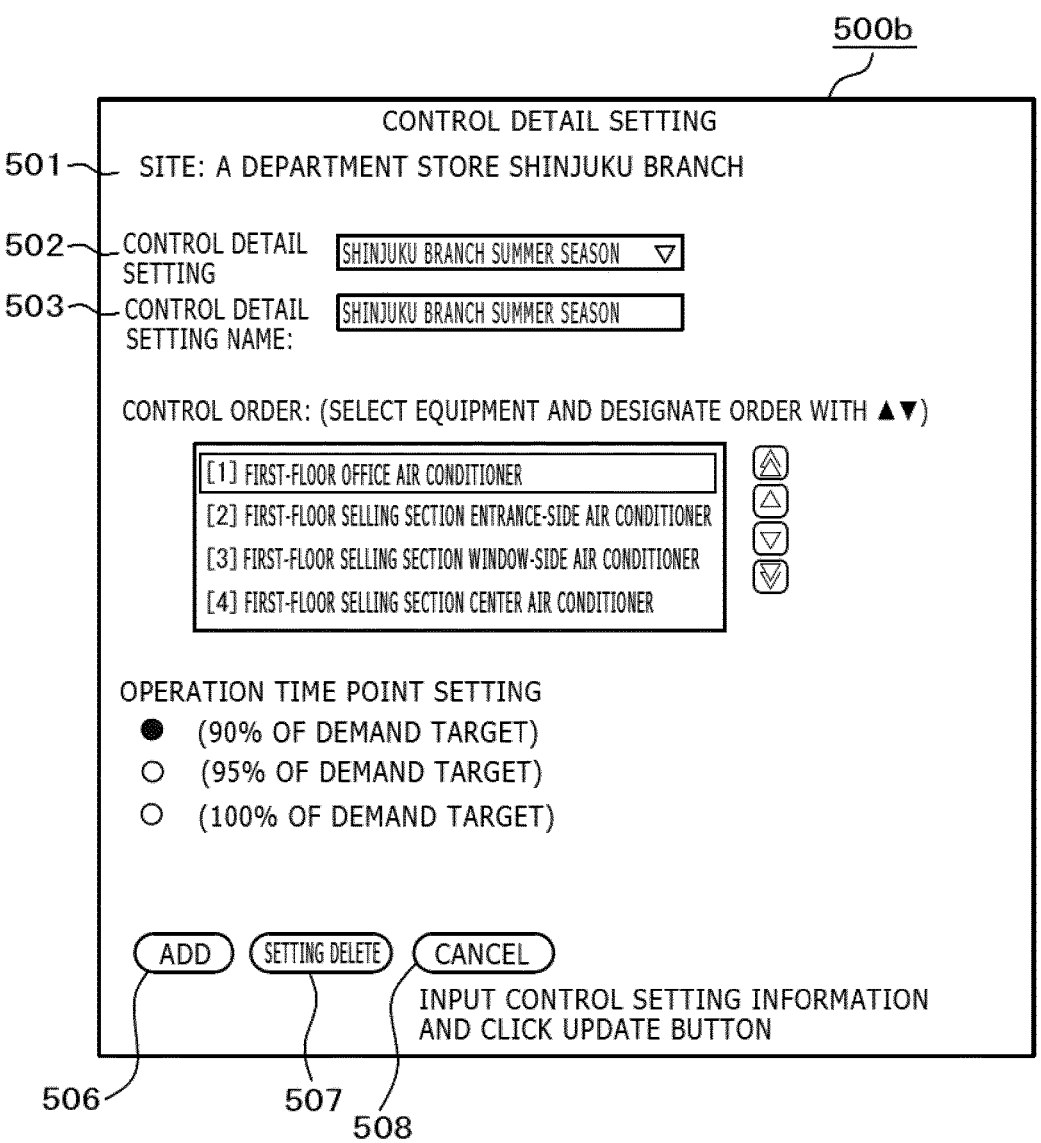
FIG. 21B is a diagram showing an air-conditioning control detail setting screen to be displayed upon updating/deletion.

FIG. 21B is a diagram showing an air-conditioning control detail setting screen to be displayed upon updating/deletion.

The user displays all of an air-conditioning control setting screen 400 and air-conditioning control detail setting screens 500a and 500b and inputs necessary values onto them by operating the client terminal 30.

On the air-conditioning control setting screen, the user inputs a site into a Site entry field 401 or selects it.

On Setting List 410, a list of air-conditioning control settings which have been prepared in advance for demand control is being displayed.

When an air-conditioning control setting is to be added, respective values for Period 421, Time 422, Auto-OFF 423, Non-Operation Day 424, Area 425 and Control Detail Setting 426 are input through an air-conditioning control setting entry field 420 and an "Add As New Setting" button 404 is clicked. By this operation, a setting ID is automatically given and is added to List of Settings 410.

When the air-conditioning control setting is to be deleted, a Delete button 403 is clicked.

In addition, when the air-conditioning control setting is to be updated, the air-conditioning control on List of Settings 410 is selected, the values which are being displayed in the air-conditioning control setting entry field 420 are changed and an Update button 405 is clicked. When the values which are being displayed in the air-conditioning control setting entry field 420 are to be cleared, a Clear button 406 may be clicked.

Control Detail Setting 426 is a field for setting the control order of air-conditioning in the site and the operation time point for performing the demand control. In order to freshly add a control detail setting, an Add button 428 is clicked.

When the Add button 428 is clicked, the air-conditioning control detail setting screen 500a which is shown in FIG. 21A is displayed. Then, for example, "First-Floor Selling Section Summer Season" or the like is input into Control Detail Setting Name 503 as a control detail setting name.

Since a list of the air conditioners in the site is being displayed in a Control Order field 510, an objective air conditioner is selected and the control order of the selected air conditioner is changed by clicking an Order Change button 511. Here, the one which is present higher is higher in priority order and the air-conditioning operation thereof is preferentially restricted upon demand control.

In a field of Operation Time Point Setting 520, whether the demand control of the air conditioner is performed when the power consumption in the site has reached what % of the demand target value is set.

Then, when a control detail setting is to be added by the input value, an Add button 504 is clicked, and when the input value is to be cancelled, a Cancel button 505 is clicked.

In addition, In order to perform updating/deletion of the control detail setting, the control detail setting is selected from a Control Detail Setting combo box 427 and an Update/Delete button 429 is clicked.

When the Update/Delete button 429 is clicked, the air-conditioning control detail setting screen 500B which is shown in FIG. 21B is displayed. Since the already input control detail setting is being displayed in a Control Detail Setting field 502, when the control detail setting name is to be changed, a new name is input into Control Detail Setting Name 503.

In addition, when needed, the values of the control order and operation time point setting are updated and an Update button 506 is clicked. When the selected control detail setting is to be deleted, a Delete button 507 is clicked and when the input value is to be cancelled, a Cancel button 508 is clicked.

Next, in order to perform temperature setting on each area, a Temperature Setting entry field 430 is used.

The user inputs the name of the area to be controlled and inputs the cooling or the heating as distinction of the operation selection, the lower limit temperature, the target temperature and the upper limit temperature.

In addition, in order to make the temperature setting valid, a selection check box 431 is clicked.

In this example, for the first-floor selling section area, the setting is made such that the operation selection is the cooling, the lower temperature is 20° C., the target temperature is 25° C. and the upper temperature is 30° C.

REFERENCE SIGNS LIST

10 . . . power measurement monitor, 50 . . . temperature/humidity sensor, 20 . . . server, 30 . . . client terminal, 40 . . . router, 80 . . . signal conversion device, 90, 95 . . . air-conditioning control equipment, 100 . . . base terminal (master device), 200 . . . display terminal, 300, 315 . . . air conditioner, 305 . . . outdoor equipment,
110 . . . MPU, 120 . . . RAM, 130 . . . ROM, 140 . . . network IF, 150 . . . USB IF, 160 . . . card slot, 170 . . . wireless IF, 180 . . . antenna,
201 . . . CPU (Central Processing Unit), 202 . . . main storage, 203 . . . network IF, 204 . . . graphic IF, 205 . . . input/output IF, 206 . . . auxiliary storage IF, 220 . . . display device, 241 . . . HDD, 242 . . . DVD drive (Digital Versatile Disk).

The invention claimed is:

1. An air-conditioning control system having:
a power measurement monitor that measures an amount of power consumption of electric equipment installed in each site;
a temperature/humidity sensor that measures a temperature and a humidity in an area that configures each site;
an air-conditioner that is installed in the area that configures each site;
air-conditioning control equipment that is connected to the air conditioner or outdoor equipment of the air conditioner to control the air conditioner or the outdoor equipment;
a base terminal that receives measurement data of each site so installed and the area that configures that site from the power measurement monitor and the temperature/humidity sensor and is connected to the air-conditioning control equipment to transmit an air-conditioning control instruction to the air-conditioning control equipment; and
a server that is connected with the base terminal via a network and retains management information and air-conditioning control information of each site,
wherein the air-conditioning control information includes a target power value for demand control in each site and a lower limit temperature and an upper limit temperature in the area that configures each site, and
the base terminal receives the air-conditioning control information from the server, when a power consumption value in the site is greater than the target power value for demand control on the basis of the received air-conditioning control information, transmits a control instruction for turning the air conditioner OFF to the air-conditioning control equipment, and when a temperature measured in the area is greater than the upper limit temperature when the air conditioner is performing a cooling operation and when it is less than the lower limit temperature when the air conditioner is performing a heating operation, transmits a control instruction for turning the air conditioner ON thereto.

2. The air-conditioning control system according to claim 1,
wherein the air-conditioning control information further includes a target temperature,
the base terminal, when the power consumption value in the site is greater than the target power value for demand control, and
when the temperature measured in the area is set between the lower limit temperature and the upper limit temperature, the base terminal transmits a control instruction for partially suppressing the operation of the air conditioner in the area to the air-conditioning control equipment.

3. The air-conditioning control system according to claim 1, wherein the air-conditioning control information includes information on date and time and when it corresponds to that information on date and time and when the power consumption value in the site is greater than the target power value for demand control, the base terminal transmits the control instruction for turning the air conditioner OFF to the air-conditioning control equipment.

4. The air-conditioning control system according to claim 1, wherein the air-conditioning control information further includes the type of the air-conditioner operation of cooling/heating.

5. The air-conditioning control system according to claim 1,
wherein the air-conditioning control information further includes control order related to the operation of the air conditioner in the site, and
the base terminal transmits the control instruction for turning the air conditioner OFF in order starting from the air conditioner that is higher in the control order to the air-conditioning control equipment.

6. An air-conditioning control method for an air-conditioning control system having:
a power measurement monitor that measures an amount of power consumption of electric equipment installed in each site, a temperature/humidity sensor that measures a temperature and a humidity in an area that configures each site, an air-conditioner that is installed in the area that configures each site, air-conditioning control equipment that is connected to the air conditioner or outdoor equipment of the air conditioner to control the air conditioner or the outdoor equipment, a base terminal that receives measurement data of each site so installed and the area that configures that site from the power measurement monitor and the temperature/humidity sensor and is connected to the air-conditioning control equipment to transmit an air-conditioning control instruction to the air-conditioning control equipment, a server that is connected with the base terminal via a network and retains management information and air-conditioning control information of each site and a client terminal that is connected to the server to transmit the air-conditioning control information, wherein the air-conditioning control information includes a target power value for demand control in each site and a lower limit temperature and an upper limit temperature in the area that configures each site, and having:

the step that the base terminal receives measurement data on power related to the site from the power measurement monitor;

the step that the base terminal receives measurement data on temperature related to the site from the temperature/humidity sensor;

the step of transmitting air-conditioning control information from the client terminal to the server;

the step that the server retains the received air-conditioning control information;

the step that the server transmits the air-conditioning control information to the base terminal; and the step that when a power consumption value in the site is greater than the target power value for demand control, the base terminal transmits a control instruction for turning the air conditioner OFF to the air-conditioning control equipment, and when a temperature measured in the area is greater than the upper limit temperature when the air conditioner is performing a cooling operation and when it is less than the lower limit temperature when the air conditioner is performing a heating operation, it transmits a control instruction for turning the air conditioner ON thereto.

* * * * *